(12) United States Patent
Dean

(10) Patent No.: US 7,387,587 B2
(45) Date of Patent: Jun. 17, 2008

(54) TRANSMISSION

(76) Inventor: Malcolm L. S. Dean, 18 Menkira St Mansford, 4122 Brisbane (AU)

( * ) Notice: Subject to any disclaimer, the term of this patent is extended or adjusted under 35 U.S.C. 154(b) by 272 days.

(21) Appl. No.: 10/534,841

(22) PCT Filed: Nov. 17, 2003

(86) PCT No.: PCT/AU03/01536

§ 371 (c)(1),
(2), (4) Date: May 13, 2005

(87) PCT Pub. No.: WO2004/046584

PCT Pub. Date: Jun. 3, 2004

(65) Prior Publication Data

US 2006/0111215 A1 May 25, 2006

(30) Foreign Application Priority Data

Nov. 15, 2002 (AU) .............................. 2002952792

(51) Int. Cl.
*F16H 3/70* (2006.01)
(52) U.S. Cl. .................................................... 475/173
(58) Field of Classification Search ........ 475/170–173, 475/903
See application file for complete search history.

(56) References Cited

U.S. PATENT DOCUMENTS

| 1,154,769 | A | * | 9/1915 | Hertzberg .................... 475/280 |
| 2,478,868 | A | * | 8/1949 | Hasbany ...................... 475/284 |
| 3,008,355 | A | * | 11/1961 | Grudin ........................ 475/334 |
| 4,928,552 | A | | 5/1990 | Gabriele |
| 5,484,348 | A | * | 1/1996 | Brown et al. ................ 475/248 |
| 5,503,605 | A | * | 4/1996 | Beim .......................... 475/283 |

FOREIGN PATENT DOCUMENTS

| AU | 465202 | 9/1974 |
| AU | 613927 | 1/1989 |
| AU | 607822 | 5/1989 |
| AU | 462995 | 10/1991 |
| AU | 93246/98 | 6/1999 |
| AU | 742781 | 7/2001 |
| AU | 2003204953 | 7/2003 |
| DE | 4110406 A1 | 10/1991 |
| WO | WO 00/17542 A1 | 3/2000 |
| WO | WO 02/075180 A1 | 9/2002 |

OTHER PUBLICATIONS http://www.insightcentral.net/encyclopedia/encvt.html; InsightCentral.net—Encyclopedia—Honda Insight CVT; CVT Transmission; Nov. 21, 2005.
Polder, A Network Theory for Variable Epicyclic Gear Trains, 1969, Greave Offset, Einhoven, Netherlands.

* cited by examiner

*Primary Examiner*—Tisha D Lewis

(57) ABSTRACT

A module comprising at least the groupings (11) and (12) which remains the same for all embodiments. Assemblies (11) and (12) are effectively side by side unequal co-axial assemblies. Assembly (11) is the unequal coaxial assembly and comprises of a cam {sun-element} (17), bearing (18) and rollers {planet-element} (20). Assembly (12) is the second unequal coaxial assembly and comprises of a rotor (15), cam {sun-element} (16) and rollers {planet-element} (19) being constrained with the planet elements of the assemblies and body (45) within the body element (21) of assembly (11).

26 Claims, 8 Drawing Sheets

TRANSMISSION

This invention relates to devices for the transmission of mechanical power in the form of rotational motion. In particular, it is directed to transmission of power between a first rotationally movable element and a second rotationally movable element to provide a device which can provide, in a preferred form, continuously variable ratios, of angular velocity at an input to angular velocity at an output, within the range of ratios −1:1 to 0 to +1:1.

The present invention finds use in electronic, hydraulic or mechanical applications and, in a preferred form, provides variable input and output speeds; an output angular velocity that varies from 0 to + the gear ratio as the input varies from zero to the input angular velocity; torque multiplication; the ability to vary speed and torque. Furthermore, the present invention provides multiple inputs and/or outputs and reduction, step up or 1:1 gear ratios. This invention, includes the use of a planetary drive, that is a drive which includes a set of rollers, bearings or similar moveable parts, arranged in a circle around an axis and configured so that, through their movement in concert, apply torque to a body whose resultant rotation is used as the output of the drive. Examples of similar drives are described in Australian Patents 607822 and 613927 as spin control differentials for vehicles and couplings. A planetary drive based on a sun gear, a ring gear, and a planetary gear carrier is disclosed in Australian Patent number 465202 in the name of Eaton Corporation.

Examples of planetary drives are manufactured by Sumitomo Heavy industries Ltd, Japan, under the name "Cyclodrive". Although planetary gears are known, the prior art gears have failed to take advantage of certain of their features, in particular, the contra-rotational nature of the input and output shafts being on the same axis.

This present invention advancement is a "Transmission" (referred to as an "eM Dean" sometimes) having at least one input and one output and being of the epicyclic type involving interaction of three mechanically distinct rotating elements with any suitable form that allows the transfer of torque between input and output, namely a sun element, a ring element and a planet element in each of at least first and second unequal co-axial epicyclic assemblies, a first element of the first assembly and a first element of the second assembly able to rotate independently, the first element of the second assembly within the first rotating element of the first assembly, a second rotating element of the first assembly and a second rotating element of the second assembly being constrained to rotate at a common angular velocity, a third element of the first assembly being connected to a motive source, and control means for progressively changing the gear ratio applied to a load connected to the first element of the first assembly of the transmission, (referred to as an "eM Dean" sometimes or Variable Ratio Multi-gear sometimes) characterised in that the first and second assemblies each represent unequal fixed gear ratios respectively between the input and the output of the transmission, (Variable Ratio Multi-gear,) the first and second assemblies arranged so that if individually each assembly has their first element constrained and their third element rotated in a certain direction the second element will try to rotate in an opposite direction relative to the tendency of the other assembly, the control means being operative to progressively increase or decrease the output gear ratio in accordance with the demand for an output lower or higher gear stage of operation.

Alternatively the roller gear is described following, wherein the first elements are the ring elements of the respective assemblies, the ring elements being outer bodies having spaced endless scallop guides being adapted to receive sets of planet elements being in the form of rollers, the second rotating elements comprising of planet carrier elements and planet elements, the planet carrier elements of the respective assemblies constrained to rotate about an axis collinear with the axes of their respective third elements, the planet carrier elements locating and controlling the motion of integral spaced sets of rollers corresponding to the planet elements of each assembly, the rollers bridging between the scallop guides of the outer bodies and the third elements of the assemblies, the planet carrier elements being constrained by a rotation controlling means allowing free rotation in one direction and a controlled rotation in the other direction, the third elements of the assemblies being sun elements in the form of respective cams. This new advancement of having an internal Body now within another is described below under the relevant wording which refers to it is as follows.

It describes my present older Patent designs with ring-gears being "side by side" as can be seen in the cross section drawing of FIG. 2 which more clearly explains the FIG. 1 in all these Patent drawings. FIG. 1 shows the variable options with internal—either single electric or double contra-rotation and further optionally three rotor electrical control variations. The electrical coils were then shown as with multiple hypothetical abilities, with FIG. 2 explaining the practical necessities as to how the ring-gears would be physically constructed for the optional external one or more or combined power sources such as for Hybrid applications as well.

The Electrical options are described on page 9 from lines 18 in the PC/02/00305 as follows—The magnetic effects caused by item (25) can drive the cage (22) with the same action as (23) does on item (14) The torque caused by items (25) would need to be higher relative to the torque required by the cams (16) and (17) and so the electric coils are an ancillary action and not necessary for the central concept of the present invention. Although it is necessary for some applications to include it. This is for such as storage of energy by electronic and/or mechanical control as described further on.

With any means of reverse rotation restriction of the carrier being able to implement a first torque transition to the load. This is when an input rotation is applied to the cam (sun gear). This third rotor coupled to the double carrier (22) is so long in FIG. 1 thus able to be actuated alternatively by a ground reference one way restriction or where accumulation of energy is able to be accessed. The ground reference is shown with the shaded area of the housing. In order to more easily see how energy storage is actuated we can refer to the first Patent Windmill experiment. Several alternative methods have been described with some trailed, within the previous pages, in divisional Patent 2003204953 (from AU 93246/98) There is described how by placing a small wind turbine blade on the input cam (sun gear), being the first input; say at 1 to 6 ratio. There can be a simple storage of energy provided in a simple three component epicycle configuration of gearing. This was described by having another large heavy turbine blade on the reverse rotating cage (carrier).

At low wind speed the heavy load coupled to the body (ring-gear would not be able to be turned because of the high torque necessary. Instead the large heavy blade would be forced to rotate in the opposite direction to its designed pitch. Thus being forced into the opposite direction thus gaining momentum (against the wind) to its normal direction. It would turn when the wind increases for its designed "Pitch" for turning the load, this is because of the reduction gearing. As the wind increases the large blade slows slightly from reversing, due to the designed "pitch". Immediately the added torque from both the first small wind turbine blade together with the momentum developed by the reverse rotating large blade reproduces the recovered storage of energy able to now provide enormous torque to start the load rotation. Eventually the load will turn faster than either of them and the load will also turn faster than both them, the two input rotation speeds will be added together on the load.

The duty cycle of the windmill is thereby increased substantially not only because it could absorb useless recoverable energy but it overcomes the common problem of the unpredictability of sufficient wind to even just get a load started. Sometimes there will never enough wind to even be strong enough to start a windmill for days. Whereas this can now make the difference between even the viability of wind power. The other advantage with this transmission is that we now can have much smaller blade diameters because of our optional contra-rotating blades, together with the coupling with the higher torque such as with the Compact Torque Multiplier herewith as described below. Multiple windmills can now fit side by side on one tower. Similarly Solar energy systems, such as for driving pumps have initial starting frictional load features to overcome. By having some simple mechanism which would similarly work on a reverse Epicyclic reduction gear component against a ground reference (which the large windmill blade could be likened to or indeed have integrated with it by including a one way clutch to a ground reference). However in this situation a coiled torsion spring or a heavy weight hanging on a cable could be used instead of the large heavy blade. By clever design there can be a resetting coiled spring locking onto a shaft which could allow the following to provide even more torque and energy storage. This can be very simple just to give a load a kick off.

The next step to understand this invention was the providing of a "very compact Torque Multiplier" this is done by adding a double Cage (Carrier) and a fourth Planetary Component, being another cam (sun-gear).—(not including the rollers etc which are needed). This present new Patent Application Epi-cyclic design is now advancing this invention where one body is within another, not side by side as all my others were. Where it is needed to drive any wheel, this requires that the output is accessible to optionally act as the wheel hub and so obviously to be the outside ring-gear and around the other ring gear, which being a smaller lower power roller is now within it.

One Patent Attorney suggested that we may attain an even earlier priority date from even this present Patent Application if it is taken that my previous one—PCT/02/00305 discloses this somewhat already by showing a body within a body where the heavy output ring-gear (21) is shown within the smaller roller ring-gear in FIG. 1. This smaller roller ring-gear was only shown in this position, to show another optional configuration and at the same time so as to accommodate the optional field coils (23,24,25) and further to show the relationship to the double carrier (22) relevant to everything else. Therefore it had to be drawn at the larger diameter, this put it at (26) shown as ground reference, with a small dotted line indicating the second optional rotating ring-gear option.

In order to further describe this invention please refer to page 2 of my Divisional Patent "Converter" AU 35198/01 which provides Polders Epicyclic calculations. The following applies to this present advancement in appropriate wording and is included so as to understand the present Claims, where any type of epicyclic gearing may be used.

There are some pertinent descriptions made in my prior Patents which can now make this new advance clearer. Some of the earlier description can show unique construction of this new drive now optionally using the replaceable ring gears as especially designed to act like replaceable inserts. This is to easily change any fixed ratios if thought necessary after manufacturing is completed, or to change the speed of a conveyor belt for example. Some early references are also made and described in the "Wheels Within Wheels" Document 6-6-96 which was not available except under strict confidential disclosures. Such as in item 32 which is available by referring to Divisional Patent AU—2003204953—which was re-applied for in year 2002 which was originally from Patent Application AU 93246/98.

The drawing of FIG. 3—showing four wheel steering further becomes viable now with this new patent advance. Having the ability to now have the four wheel vehicle with four wheel steering and also four wheel drive being able to incorporate self contained motors of any type, such as Electric, Hydraulic, or Hybrid of any kind. Constant Velocity Joints can be discarded.

Alternatively there is the ability to incorporate enormous technological leaps by providing "Three Dimensional" features such the kind of vehicle which can lean into a corner—like a motor-cycle, see FIG. 8 from this Present Patent Application.

Some of the unique uses described for this "Ultimate Transmission" invention, which can be providing every conceivable extreme requirement, I have ever required. Able to be self contained or support everything, able to integrate multiple inputs and outputs, single inputs can deliver and provide, high torque variable speed transmissions, to continuously variable, to infinitely variable speed, to sequential transmissions to likening it to operating as a type of Yo-Yo action, to linear transmission outputs and further can be performed on one axis, or to and from any other axis. Able to be low cost with low wear, can be designed for short duty cycles because nothing is moving when up to 1 to 1 ratio. As also where there is unlimited speed requirements because there only need be the difference from input to output speed, it may contain its own lubricant which can double to provide automatic governing, and easy maintenance. It is also able to use advanced materials such as ceramics or titanium, yet sizes can be from Micro to Macro.

The great advance is that the intrinsic nature of this fixed ratio gear design allows the multiple gearing inputs and outputs to become dynamically interrelated, the components of all the relative reference points can be exploited as they are all moving relative to each other. The gear shafts can be massive where required for extremely low ratio leverage enabling the whole structure of the machines to be "alive".

Some hybrid description of this invention given by a highly respected Mechanical Professor, he suggested it as advancement for Toyota and is very appropriate, particularly with reference to their hybrid drives.

Many energy storage and integration of rotational force options are possible. Governor action can further be controlled by the intrinsic dynamic nature of the transmission having fixed ratios, which may centrifugally equalise the inputs and outputs for optimum operation. (Electronic control for optimum performance together with maximum efficiency is extremely complementary to this transmission and relatively low cost, with manual over-riding being available).

As further understood by the Engineering Professor, a "Pulley" system he further explained how some of the more exciting features of the dynamic component of this invention can be better understood, by labelling FIG. 5B herein as showing an "internal View" and labelling FIGS. 4A and 4B as showing an "External View" (the three dimensional view being seen for example by looking at FIG. 8, showing the car and passengers tilting into the corner like a motor-cycle instead of throwing out as would normally occur.)

There can be seen the two variable gears positioned between the two front wheels and also between the rear wheels. Continual correction is thereby available to smooth out travel for total passenger comfort. FIG. 3 can be integrated with FIGS. 4A and 4B for camber and caster. The combined advance of low cost electronic sensors can be input into low cost Miro-processors thereby providing pre programmed reactive correction for any scenario and every obstacle or road irregularity encountered. This is the ultimate result which can be incorporated together with linear high torque acceleration and smooth braking.

Silicone Polymers as used in shock absorbers are very complimentary and optionally able to be used for many of the present advances. These can be actuated again by low cost high voltage, low current electronics.

Other advanced body shapes and structures may be used such as for strength, low wind resistance ease of manufacture. By using the extremely indestructible structural shape which may be understood as a Three in One structure which provides the minimum surface area to maximum capacity and may be understood to have physical, scientific, chemical and spiritual dimensions and connotations. Three equilateral triangles form the basis of this structure with the ability to view right around in a 360-degree path in any direction in our three dimensional world, it is called a "tetrahedron." However in order to provide substance and capacity, we have to have a fourth side, (which can be positioned anywhere from infinity to infinity) this fourth side is also an equilateral triangle. Einstein postulated that our world is three-dimensional, where a fourth dimension can be understood as being time. This tetrahedron structure further can be extended into as many more of these triangles if required thereby providing extremely strong enclosures.

For our present convenience, rectangular connecting panels for extending for example two of these enclosures together for example for building longer high-speed vehicles and also for water transport would be options. After the previous advanced optional features, the following 18 lines below is the wording direct from this present Provisional Application. Further explaining that the old ring gear bodies had no rotational movement between them except where clearly shown, being always positioned side by side. "The bodies of this transmission" may be manufactured by any known method, being described as "laminated", the scallops or ring-gear may be provided side by side in any known method where there is no rotational movement in between them.

As described previously they can be inside the wheel, the scallops can be machined inside the wheel hub, inside complete with motor, (or contra-rotating motor). Or other epi-cyclic designs could be used where the bodies may be, for example within each other. Or pump combinations may be used without differentiating from the present invention. (There is the exception shown in for example in FIG. 11 where there is a flange showing very clearly where such a split-would be such as for fans or similar. However the latest Patent P.C.TAU/02/00305 do have a split body, but between the first epicyclic movements double carrier as an alternative design). Any number of ring gear/scallops could be manufactured in one piece, simply bolted together, or slid into rotational restricting cavities, enclosed (see inserts to add or change ratios in item 32), or any other epicyclic design may be used such as described in this patent.

With the PCT/02/00305 not only was it found difficult to seal the lubricant properly, but there was very little support available from the body for applications needing support from one end only, this is due to the Patent limitations if trying to claim for other than a split body. Other drives such, as AU 74784 could have claimed the ability to have a ring-gear body extension to overcome the above as it has similarly the separate ring gears. Any other Epi-cyclic (or Planetary) Gearing such Toothed or any type can have similar "Torque Multiplying" abilities as was listed in my original first front page similarly to as copied above. It included the EATON Patent. Number on the front Patent page as now. It further includes the CYCLODRIVE types of Epi-Cyclic designs described. By choosing particular configuration for the Cyclodrive type we are able to also use them or to integrate them with my roller gear design, or also with toothed gearing as well, with any type. Now we can have a powerful drive with everything working better because it is doing this within a body. In order to be within it wasn't easy to figure out how to add the second one way clutch working in sequence together with the first one way clutch referenced to ground, as it had to be built before it could be proven. There is the option of having another one way clutch for motor braking, controllable or even manual, or automatic, between the input shaft and output (usually being the body or a ring gear with the roller gear option).

Where it is chosen to use one or more Pumps (instead of our own roller design) we need a first carrier rotating in a reverse direction to the input and output directions. Thereby this can be adapted for obtaining the fundamental first powerful fixed ratio. There is needed a one way restriction of the carrier against a ground reference but as it will have to be internally actuated, a second one way restriction has to be sequentially actuated-from the other end. Then any chosen manner such as with the carrier being non-rotationally coupled to another Epi-cyclic component to form a "Compact Torque Multiplier" configuration with the first pump or gear. Any means can be applied to propel the drive further forward by accessing the "Torque Multiplier" with such as a centrifugal clutch between the center shaft direction and the super sensitive oppositely rotating second sun gear, (as shown with the optionally chosen roller design drawings shown). This is in order to similarly lift the load away in the forward direction, from the one way restriction and this is achieved then (for example) by providing a centrifugally controlled variable coupling (or reduced frictional coupling). (Any type of control to which even external or manual override can take over control when chosen, may be used). This is accessing the Torque Multiplying feature to leave the one way clutch and for advancing the load forward.

If chosen the second roller gear or any other epicyclic design can be supported by this main first Epi-cyclic gear or pump, then by sequentially operating one way restrictions, (this can all be alternatively designed totally inside the body of the first pump/gear).

Hydraulics is very complimentary to this drive. This also has the added simplicity of providing enormous "Regeneration" for example by having the internal one way action being designed to pressurise internal or external accumulators. These can be controlled by pressure valves and pressure sensors. Either internal automatic self regulating for a load or controlled externally. The load or loads may be controlled such as hydraulically in series for example with four (or more) wheel drive vehicles externally. Automatic control by centrifugal action is one of the optional features, as the demand is required by the load. Or alternatively by a simple centrifugal frictional clutching. Electronic control is also optional.

Any pumping, whether from the inherent displacement within the roller design or standard pumps are modified, can as well provide pressure control which can be designed into the drive by discreet or clever channeling for providing wear free features as well, such as for replacing the need for Frictional Centrifugal Clutches. This can also facilitate automatic control and governing of speed. Hydrostatic balancing as above also for oil filtering, cooling, and also so as to form a lubricating film between contacting surfaces. This can also stop or control metal to metal wear.

In our FIG. 2 drawing there is added a second optional extension on the right hand side as advanced from the previous FIG. 2 "A Converter" Patent, which now also can have another internal Ring gear no 51 instead of the cage (carrier) as before. The output can be taken now from this added output no. 51 this is by removing the two bolts with arrows shown.

Although this transmission is shown in this configuration, which may provide over-drives—no 52 and reversing no 50—features now. Reversing is available from either end by choosing suitable configurations and by breaking these. (High torque reverse braking can be applied if another configuration of the torque multiplier is chosen at the right side instead of the reduction gear shown). There is the option of adding more inputs and outputs where required. Selection of ratios can also be provided by including different ring gears within the Body Case with the ability to change ratios for example by moving the concentric selectors sideways. There is the ability to change ratios also by sliding the ring-gears in or out (as also for permanent ratio changing, if chosen completely in and out of the Body case being made as having non-rotational ring-gear inserts, (as described in item, 32 Wheels Within Wheels 6-6-96.)

BACKGROUND TO THE INVENTION

Epicyclic gear trains are common. Polder describes variable epicyclic gear trains in his publication "A Network Theory for Variable Epicyclic Gear Trains" published in 1969 by Greve Offset N. V. Eindhoven, Netherlands, an epicyclic gear being characterised as a black box unit with three rotating elements which are effectively able to be considered as shafts since any one may comprise an input or output, represented in a mathematical mode as a "three pole" device with one linear equation for angular velocities and two linear equations for torques.

The equation for angular velocities is written in the general form and can be seen if chosen by referring to my previous invention as follows. THIS invention relates to A CONVERTER of the epicyclic type. The present application 2003204953 is a divisional of parent application No. 42515/99. Polder's network theory of variable epicyclic gear trains involves simplifying any epicyclic gear train into an equivalent involving three pole branches, usually a combination of simple three pole transmission branches and three pole epicyclic branches.

Clearly by appropriate selection of the ratios the torque and power characterisation of any epicyclic gear train can be determined in this sense the relationships involved in an epicyclic gear train are well defined. Polder suggests a number of variable epicyclic gear trains derived using his network theory. An object of the present invention is to provide an "eM Dean" gear of the epicyclic type as a useful alternative to the prior art.

OUTLINE OF THE INVENTION

In one aspect the invention provides a transmission having an input and an output and being of the epicyclic type involving interaction of three mechanically distinct rotating elements, namely a sun element, a ring element and a planet carrier element in each of at least first and second unequal co-axial epicyclic assemblies, a first rotating element of the first assembly And a first rotating element of the second assembly able to rotate independently, the first element of the second assembly able to be within the first element of the first assembly, a second rotating element of the first assembly and a second rotating element of the second assembly being constrained to rotate at a common angular velocity, and control means for progressively changing the gear ratio applied to a load connected to the first rotating elements of the "eM Dean" Gear characterised in that the first rotating elements are unequal pairs of the same mechanical elements of the respective assemblies and in conjunction with respective second rotating elements each represent different respective fixed gear ratios relative to the input and the output of the transmission the second rotating elements are unequal pairs of the same mechanical elements of the respective assemblies and in conjunction with respective said first rotating elements each represent fixed gear ratios between the input and the output of the transmission or "eM Dean" Gear a third element of the second assembly rotating in response to demand for an output low gear stage of operation of the "eM Dean" Gear and the control means being operative to progressively increase the output gear ratio and at the same time slow the rotation of the third element in accordance with demand for an output higher gear stage of operation, the control means being operative to increase or decrease the output gear ratio automatically in accordance with the said demand.

In the description "output higher gear stage of operations" means "higher" in the sense of a gear ratio approaching 1:1 ratio as input to output, while "output low gear stage of operation" means an output gearing in the opposite sense generally corresponding to a lower output angular velocity.

The first rotating elements are typically the ring elements of the respective assemblies. The ring elements are preferably outer bodies having spaced endless scallop guides, each scallop guide having unequal relative numbers of scallops to rollers in either side depending on the required gear ratios for a particular application and the guides being adapted to receive sets of planet rollers of the planet carrier elements.

The second rotating elements are typically the planet carrier elements of the respective assemblies. The planet carrier elements are typically formed as an integral unit housing spaced sets of rollers of unequal numbers relative to the number of scallops, with the rollers corresponding to the planets of each assembly, the rollers bridging between the scallop guides of the outer bodies and the third elements of the assemblies. The planet carrier is preferably constrained by a rotation blocking means to travel in one direction only. The rotation blocking means is preferably a selective rotation blocking means enabling selection of rotation of the second rotating elements in forward or reverse direction. With two rotations blocking means to work in sequence preferably reversing automatically on the internal ring-gear (45).

The third elements of the assemblies are preferably sun elements in the form of respective cams, each cam typically having a roller bearing assembly separating the cam into an inner cam and a cam ring able to travel opposite the direction of the inner cam.

The control means is typically a centrifugal clutch operable to slip to partially engage the third element of the second assembly across a continuous range of output gear ratios between fully disengaged and fully engaged positions of the centrifugal clutch at respective predetermined low and high output angular velocities. Alternatively internal or external hydraulic or any electronic, electric, magnetic control, Liquid Polymer in Silicon oil can be used together with EHT voltage with its self lubricating ability.

BRIEF DESCRIPTION OF THE DRAWINGS

FIG. 1, shows the advancement in section corresponding to prior art as from the original FIG. 4A of the parent application Ser. No. 42515/99; having being re-drawn as FIG. 1 of Patent AU 742781 or 35198/01 "A Converter", and also shown as FIG. 13A in AU 2003204953, being a divisional patent of 93246/98.—With some original detail left visible being circled with broken lines and pointing arrows to where the new positions of the same items are, for the new inner body (45). Option 1B (illustrated on the right side of FIG. 1) shows a three rotor motor with coils and magnets as before, but now within (21).

Option 1A (illustrated on the left side of FIG. 1) shows a single rotor motor (13) and (14) with a centrifugal clutch keyed to the central shaft, working in any number of known methods against item (15). Governing of the load can become automatic as an inherent feature due to the "dynamic" centrifugal nature such as with the fluid contents, providing self regulating operation. Hydraulic design techniques employed within or without can provide variable couplings between (13 and 14), or other chosen component together with built in energy storage. This can be accessed from a stationary component such as a dead axle. Internal or external fluid reservoirs are extremely compatible to the intrinsic design, as also is mechanical and/or electrical regeneration.

Figure 2:
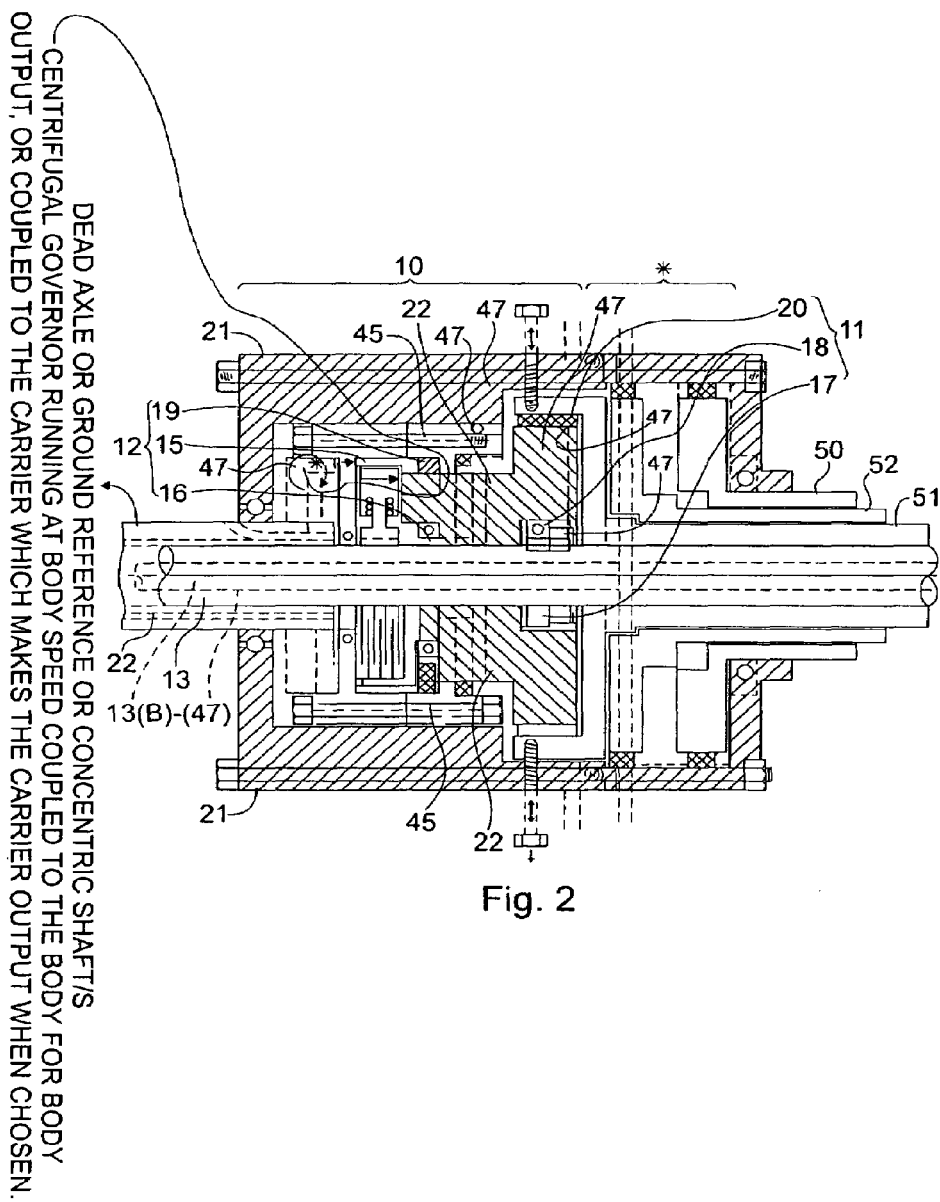
Figure 6:
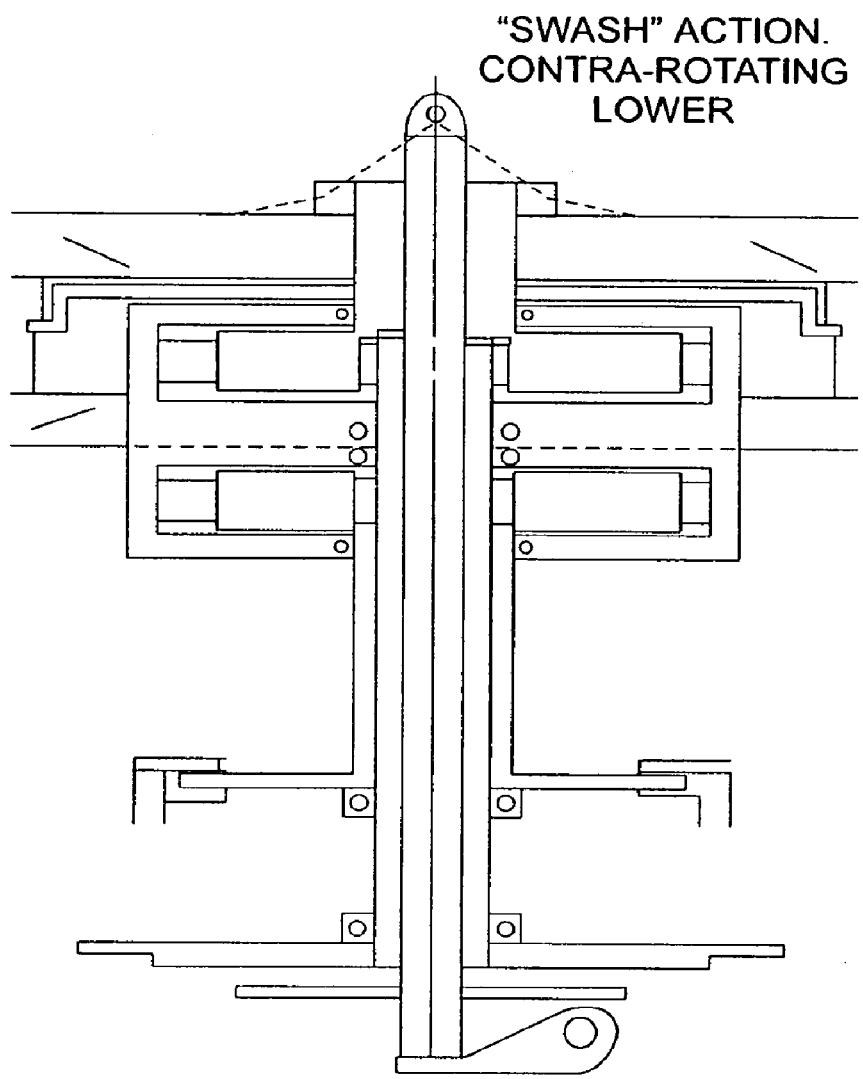
FIG. 6 depicts a transmission for a helicopter.
Figure 7:
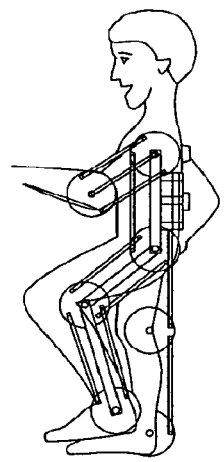
FIG. 7 depicts a paraplegic support.

2/4 =FIG. 2 is an advancement to the above FIG. 2 "A Converter" corresponding also to FIG. 6 of prior application 42515/99 and FIG. 13B in AU 2003204953 showing advancements from FIG. 2 of prior Patent AU 742781 or 35198/01 "A Converter". Some original detail is retained showing the advancement being the new inner body ring-gear, and optionally more added body extensions. There are unlimited body extensions available for multiple dynamically coupled requirements.

Contra-rotation can provide highly maneuverable helicopters with small diameter blades together with lower center of gravity, see FIG. 6

Figure 1:
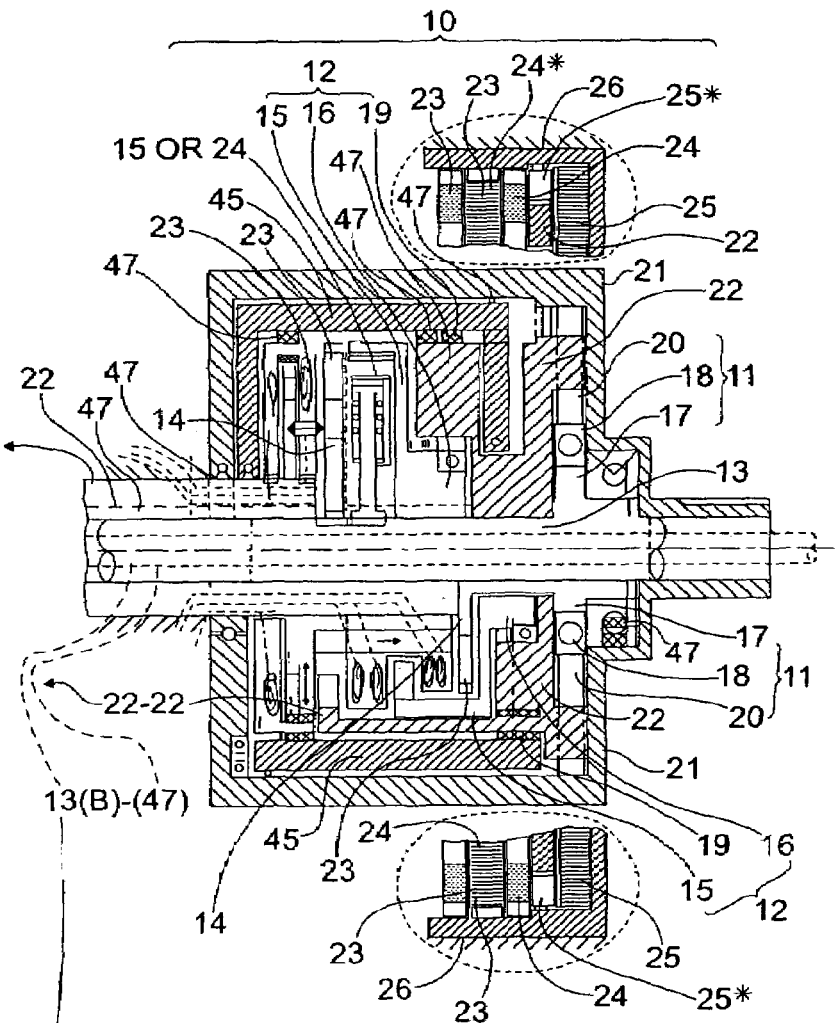
FIGS. 1 and 2 each depict a transmission according to exemplary embodiments of the invention.
Figure 5A:
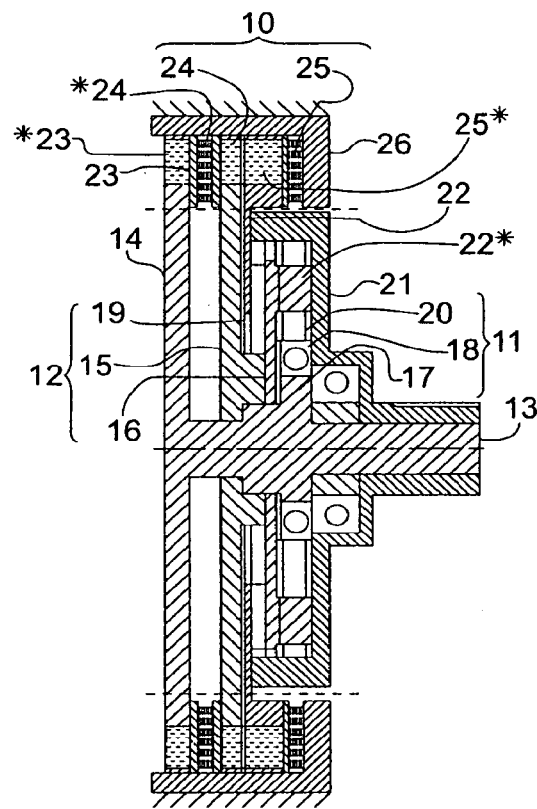
FIGS. 5A and 5B each depict a transmission according to another exemolary embodiments of the invention.
Figure 5B:
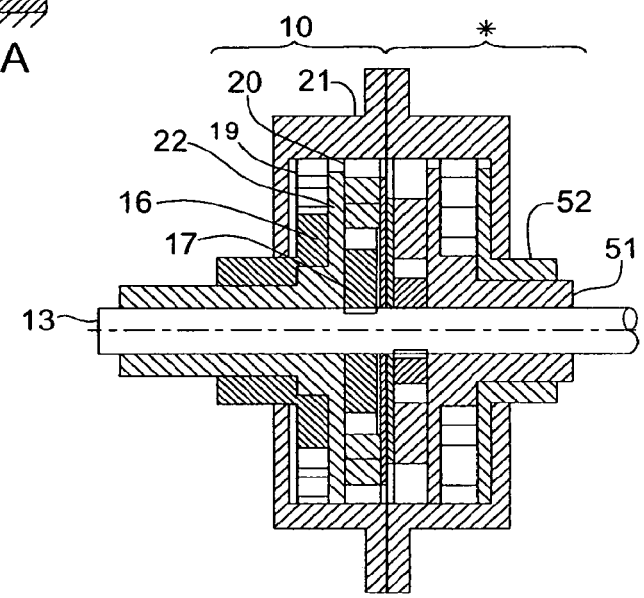

FIGS. 5A and 5B correspond to FIGS. 1 and 2 respectively from the "A Converter" Patent above and compares the older patent with the advance herein with the pointer lines indicating to the same item numbers used.

Figure 3:
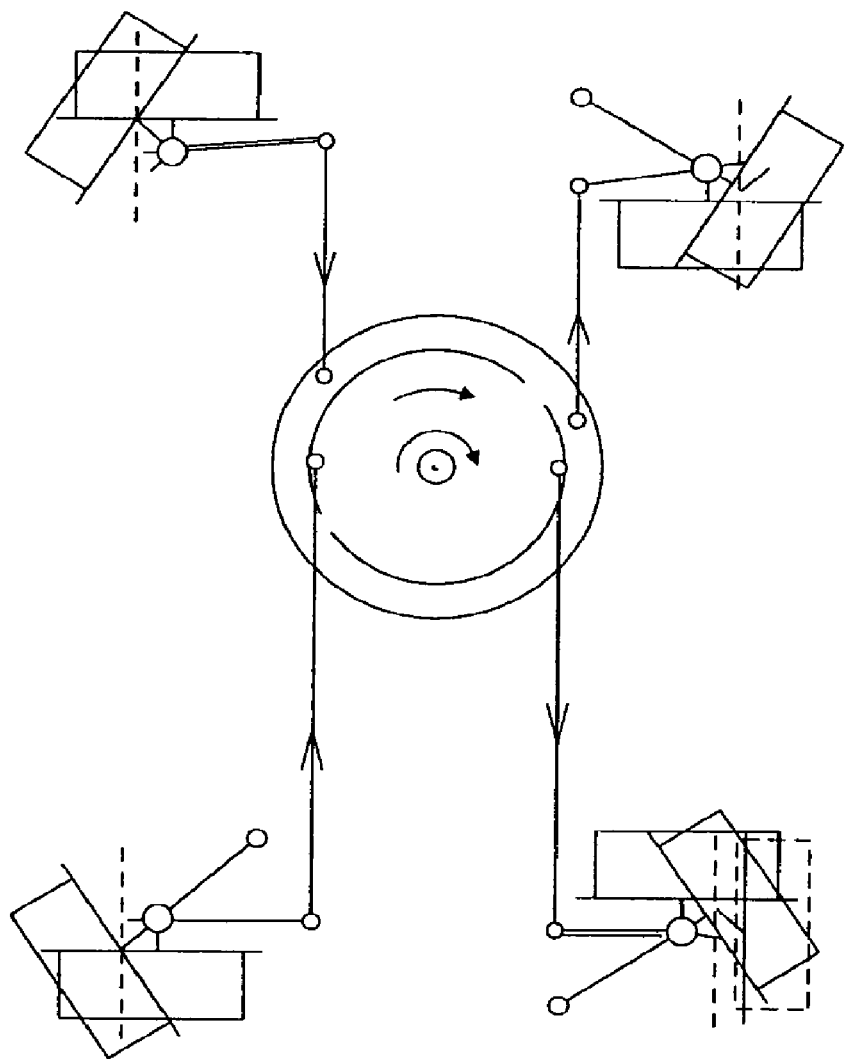
FIG. 3 depicts a schematic view of four wheel steering.
Figure 4A:
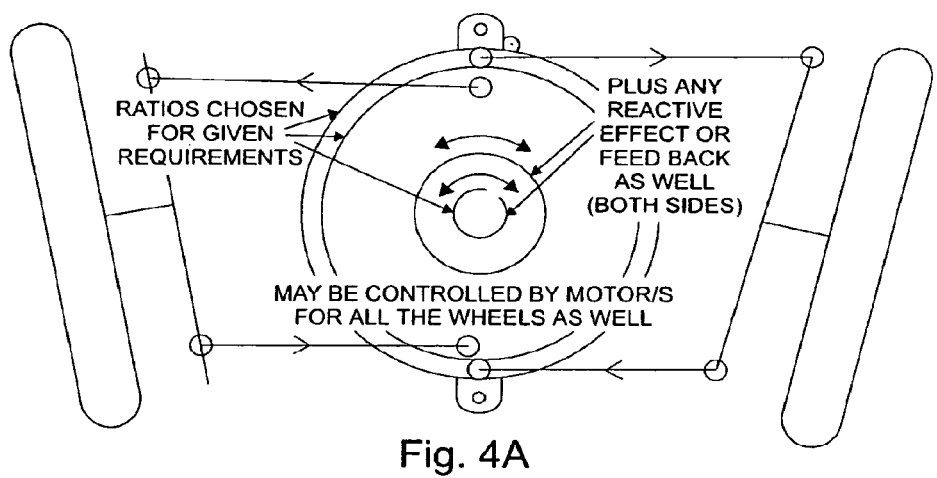
FIG. 4A depicts a schematic view of two wheels coupled to a transmission.
Figure 4B:
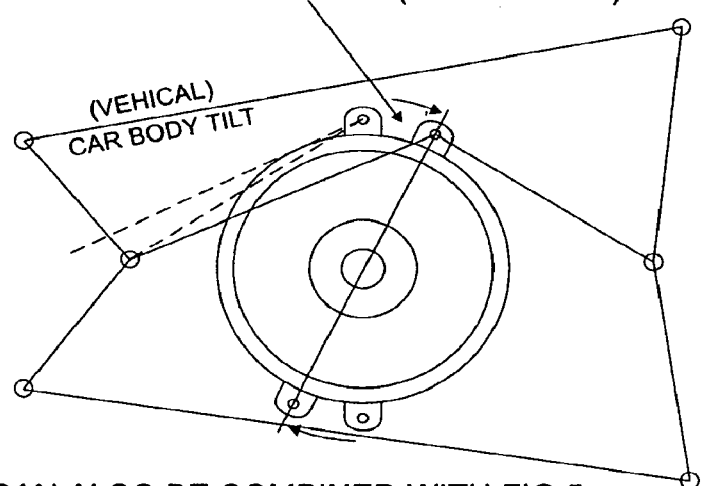
FIG. 4B depicts another orientation of the schematic view of FIG. 4A (wheels omitted)
Figure 8:
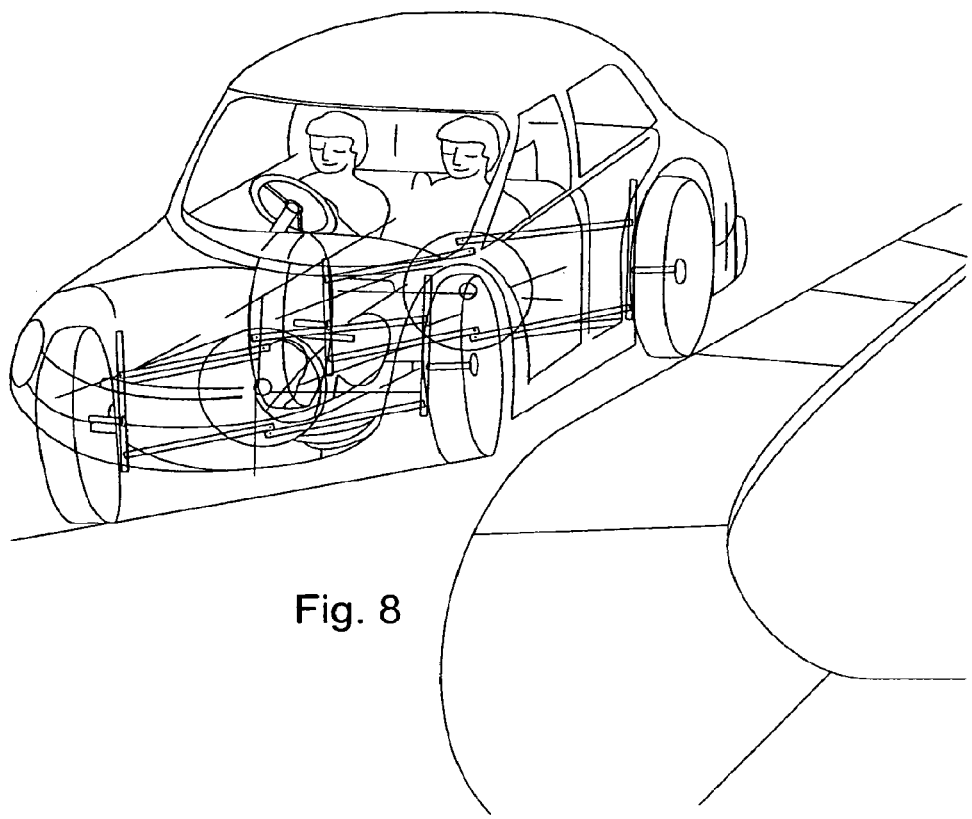
FIG. 8 depicts a car leaning like a motorcycle.

FIG. 8 which shows a diagonal view of "my Dream Car" which can be driven like a motorcycle together with the same feel of leaning into the corner. The passenger compartment is also able to be reactively tilted towards and into the corner. Sophisticated electronics can be low cost for smoothing out the corner. FIG. 3 illustrates a four wheel steering for vehicles which has now become almost viable because we can have high torque self contained motors in the wheels. (Or externally placed motors). The vehicle can drive straight forward and can also drive at right angles into the kerb to safely drop off passengers or even just for parking. With built in motors into the wheels which may be somewhat similar to as shown in FIG. 1, if chosen. FIG. 3 has just now become viable with a demonstrated working geared wheel prototype.

METHOD OF PERFORMANCE

Referring to the drawings, there is illustrated in FIG. 1 and in the left side of FIG. 2—Two eMDean Gears employing similar general configuration in both, having an epicyclic unit or module shown collectively in relation to the components concerning numerals 11 and 12 which is shown also as the 10 side in FIG. 2 with the numerals 11 and 12 again in FIG. 1 Shown here in one form and the inclusion of this module to all embodiments being the central concept of the present invention. In the example illustrated in assemblies 11 and 12, these are both of the cycloidal type, that is, employing scallops and rollers.

While each module is shown generally with the numerals 10, 11 and 12, in FIGS. 1 and 2 the particular module used in each case differs in terms of specific arrangement due to the different applications.

Modules employed will vary in specific arrangement for other applications as well. What is common is that each of the assemblies 10, 11, 12 shares a common planet element and a common ring element. With the first ring element of the second assembly 45 able to be within the first ring element of first assembly 21. Where other Epi-cyclic designs are used or integrated with the roller design, the common double carrier could be coupled to the second ring-gear, for example Cyclodrive and toothed gearing. The sun elements are separate cams, Rollers Bridge between the cams and the scallops. The planet element comprises a planet carrier bridging axially-between the assemblies having opposite sides which are unequal in terms of the number of rollers relative to the number of scallops carried by the planet carrier, while the ring elements comprise outer bodies having scallops arranged so the assemblies each represent different fixed ratios relative to an input and an output.

This means the planet carriers of the two assemblies are constrained to rotate at the same angular velocity. The outer bodies of the two assemblies are able to rotate independently in the illustrated embodiments the angular velocity of the first outer body could be zero. (Unless Rotation Blocking is actuated-see page 14. line 20, this when an input rotation is applied).

In each assembly the cams are eccentric cams which rotate in co-operation with the scallops and roller configuration of the respective assemblies. One of the cams is driven by an input shaft; this will cause the output that is the outer body, to rotate while the other cam rotates in the opposite direction. The output gear ratio is influenced by the angular velocity of the second cam, thus various braking arrangements applied to the second cam will influence the output in a controllable fashion according to demand.

While the above description deals with the general features involved the following description will enable understanding of the application of the invention to the two specific applications of FIG. 1 and FIG. 2.

FIG. 1 shows a transmission (referred to as an "eM Dean Gear sometimes") input shaft 13 with The previous alternative rotors can now still be duplicated internally concentrically, being shown as options here and also with dotted lines which were in the FIG. 1 "A Converter Patent AU 742781, or 35198/01 according to This invention as well can apply an input which is a rotor (14) an output (21) and electrical coil and permanent magnet arrangements (23-25) that did apply torques respectively to rotors (14, 15) and a planet element in the form of a cage (22).

Items 23, 24 and 25 are arrangements of permanent magnets and electrical coils so that with electricity flowing through the coils, interacting magnetic fields are produced which cause a torque on the rotors (14, 15) and cage (22) respectively. The electricity supply can be adjusted individually for each of items 23 to 25.

The rotor (14) and input shaft (13) are combined as an integrated part in this module. As an alternative, the rotor (14) could be removed and the input could be solely from an external motive source driving the input shaft (13). The point is the module comprising the groupings 11 and 12 remains the same.

Assembly 11 is the first unequal coaxial assembly and comprises of a cam {sun-element} (17), bearing (18) and rollers {planet-element} (20). The cam (17) is fixed to the input shaft (13), which is therefore fixed to the input. The bearing (18) has an inner sleeve fitted to the outer diameter of the cam (17). The bearing has an outer sleeve, the outer sleeve of the bearing (18) makes contact with the rollers (20). As the input rotates, the cam (17) causes the bearing (18) to move in an eccentric fashion. This causes the rollers (20) to be cyclically displaced away and towards the central axis of the MDean Gear the total displacement relative to this central axis, being twice the cam axis offset from this axis. The rollers (20) are located in equally spaced guides in the cage {planet element} (22). The rollers (20) make contact with scallops in the output {ring element}(21). For both assemblies (11 & 12), the number of scallops relative to the number rollers in contact with the scallops, determines the direction of rotation it would rotate the output (21) if the cage (22) was held still. One more scallop than the number of rollers gives an output rotation direction the same as the cam rotation. One less scallop than the number of rollers would give an output rotation the opposite to the cam rotation. The scallops are so shaped that as the rollers are acted on by the cam, the scallops rotate relative to the cage at a constant angular velocity ratio to that of the cam. The action between the cam (17), bearing (18) and rollers (20) against the output (21), causes an equal and opposite reaction on the cage (22), tending to rotate it in the opposite direction to the rotation of the output (21). The cage (22) is constrained by a rotation blocking means in such a way as to allow the cage (22) to only rotate in a direction the same as the output (21). Therefore because of the reactive forces, the cage (22) will be held against the rotation blocking means and will therefore be stationary relative to the frame (26) with just the actions of assembly 11 alone.

This advance is in order to provide more practical transmissions for better supporting a load and for better sealing even its own lubricant than was possible with the previous "Split Body Patent". It was therefore necessary to advance on the previous one by putting a Body within the other. (instead of the external split). This was achieved with this present new ring body inside the main Body design.

A "Solid Body" now encloses the second body within and there is a very compact "Torque Multiplier" design provided as a result.

However the following description can still be related to because either a single power source or contra-rotational and Hybrid qualities are still able to be accessed but now in a more compact and more self supporting advancement. With a "Motor Wheel" now being a reality. The rotors which were in previous FIG. 1 of A Converter are shown with pointer lines to both the new and old inputs, as easier to explain this advancement as follows. However each time there is referred to the three rotors shown, these can be replaced with a new position, but now able to be within (or internal and external power sources can still be combined such combining internal electric or hydraulic with external electric or hydraulic, such for Hybrid, where chosen).

The magnetic effects caused by items 25 can drive the cage (22) (with the same action as 23 does on item 14. This torque caused by items 25 is an ancillary action and not necessary for the central concept of the present invention.) (These components are now inside the ring gear body now with 25 being shown now with one way clutching instead, where two one way clutches are used in sequence to transfer the first powerful torque to the load from a Ground Reference).

The carrier 22 can now be actuating energy storage internally by being forced into a reversing direction to the load direction, this can provide pumping (or even a coiled torsion spring can absorb energy) The pumping can be integrated with internal accumulation or external accumulation for regeneration. There is alternatively the requirement for two one way clutches to reference the carrier 22 to ground accessed sequentially through the internal Ring Gear 45.

The one way clutches can be similar to as described in Arthur Woodbridge's Patent AU 607822 being used for a clever "Spin Control Differential" for vehicles. This Patent is now assigned to me. There is the option of having automatically reversing one way clutches if reverse direction of the load is required and motor braking is needed. However if required a motor brake one way clutch may be fitted between the input shaft and output of the gearing. The rollers will rotate about there own axis as they move in relation to the scallops. The bearing (18), is added to eliminate the sliding action of roller (20) against cam (17), which would occur (if they were in direct contact) because of the difference in their circumferential speeds. The output (21) is constrained to rotate about the central axis of the input shaft (13). The cyclical movement of the rollers (20) acting on the scallops alone, causes the output (21) to rotate at a reduced rotational speed depending on the number of rollers and scallops.

For example, if the cage (22) is constrained from being able to rotate, and if assembly 11 has four rollers (20), and there are five scallops in the output (21), the ratio would be one output (21) revolution for every five revolutions of the cam (17) with the output (21) rotating in the same direction as the cam (17).

Assembly 12 is the second unequal coaxial assembly and comprises of a rotor (15), cam (16), and rollers (19). The scallops in the second ring gear 45 make contact with the rollers (19) which make contact with the cam (16). The cam (16) is fixed to the rotor (15) (Now shown as an internal clutch drum). To reduce frictional losses, a bearing would be fitted to the outside diameter of the cam (16). The number of scallops and rollers for assembly 12 are different to the numbers for assembly 11. The rollers are located in equally spaced guides in the cage (22). The cage therefore bridges axially between assemblies 11 and 12 and the rollers (19) are constrained to rotate at the same angular velocity about the central axis of the input shaft (13) as the rollers. (20) of assembly 11. The numbers of scallops and rollers are such that if the cage (22) is held relative to the frame (26), the internal ring gear(45) tends to cause the cam (16) to rotate with an angular velocity in the opposite direction to cam (17).

For example, if the cage (22) is constrained from being able to rotate, and if assembly 12 has four rollers (20), and there are three scallops in the internal ring-gear body 45, the ratio would be one internal ring gear 45 revolution for every three revolutions of the cam (16), with the internal ring gear 45 rotating in the opposite direction to the cam (16).

If the assembly 11 cam (17) is caused to rotate, the output (21) will rotate at another angular velocity, being a fixed ratio to the input angular velocity. The assembly 12 cam (16) will rotate at an angular velocity dependent on the fixed ratio of assembly 12, and for the central concept of the present invention, in the opposite direction to cam (17). If assembly 12 was arranged so that cam (16) rotated in the same direction as cam (17), the output would be reversed if cam (16) was braked. The cam (16) will have no effect on the output angular velocity until the electrical coils of items 24 are activated. With the electrical coils activated, a torque is transmitted through the rotor (15) to the cam (16). The electrical coils could be activated so that the torque acts in the same or opposite direction as the rotation of the cam (16). If the torque acts in the same direction as the rotation of the cam (16), the output would rotate at the angular velocity determined by the fixed ratio but with an increased torque dependant on the amount of torque contributed by items 24.

The torque from items 24 act in the opposite direction of rotation of the cam (16) (ie. the same direction as the input shaft (13)). In this case, assembly 12 will act so as to try and cause the output (21), to rotate in the opposite direction and the cage (22) in the same direction as the input. In simplistic terms, the opposite actions on the output and cage caused by cam (16) tend to 'lock' the cage (22) to the input rotation. The cage (22) is free to rotate in the direction of the input (cam (17)). The cage (22) therefore tends to cause the output (21) to rotate as one with the input. The rollers (20) rotation about the central axis of the input shaft (13) due to the action of the cam (17), has superimposed on it a rotation about this central axis due to the rotation of the cage (22) in the direction of the input. It is this superimposed rotation that causes the output to increase its angular velocity relative to the input angular velocity. The amount of rotation of the cage (22) and therefore, the amount of superimposed rotation is determined by the relative differences in the output resistive torque (hereafter called the 'load') and the input torque from cam (17) and items 24. (If an internal or external hybrid input is applied concentrically about the input shaft 13 to this 15 rotor shown now instead of a motor rotor, is shown as a clutch drum this would have the same effect as 24 being electrically driven, and indeed this is concentrically accessible). When the 'load' lowers relatively and the torque from items 24 is increased, the less the torque required from cam (17). As the proportion of torque, from cam (16) relative to cam (17) increases, the more the output (21) tends to be 'locked' to the input and the more the ratio of input to output angular velocity tends to approach 1:1. The output gear ratio therefore can be progressively decreased from the fixed ratio of the first assembly to a 1:1 ratio by progressively increasing the torque acting on the cam (16) from zero to a value that causes the cage (22) to be 'locked' fully to the input. The output torque is inversely proportional to the output angular velocity.

FIG. 2 shows another embodiment of a "eM Dean" Gear, in this case there is a combination of a module 10 with extensions (on the right-hand half) that enable further multiple fixed ratios to be obtained from the one eMDean Gear The module 10 shows the central concept of the present invention. The input is via a separate motive source (not shown) acting through the input shaft (13). The output is the ring element or body (21). However many new options are available if there is the added extension FIG. 2 (For example there is now the option of a second internal body ring-gear with added cam on the right hand side which can be actuated by optionally removing the two bolts and allowing the new second internally shown with arrows. The ring-gear with output 51 can then itself drive another cage with a cam coupled to it so as to provide such as over-drive features. Another cage/cam is shown able to be driven which can provide reversing features by breaking it from being operating in a forward direction of the chosen output. There are also abilities to change ratios or other features by concentrically moving any concentric shafts in and out as shown on 50 and 52.

The first unequal coaxial assembly comprises of a cam {sun-gear} (17), and rollers {planet-gears} (20) and the ring element or body (21). The cam (17) is fixed to the input shaft (13). The outer diameter of the cam (17) makes contact with the rollers (20). As the input rotates, the cam (17) outer diameter moves in an eccentric fashion. This causes the rollers (20) to be cyclically displaced away and towards the central axis of the "eM Dean" Gear as also described in the "A Converter" prior Patent AU 742781 and A 35198/01, explaining the advance here as follows—"the total displacement relative to this central axis, being twice the cam axis offset from this axis. The rollers (20) are located in equally spaced guides in the cage {planet carrier} (22). The rollers (20) make contact with scallops in the output (21). For both assemblies (11 & 12), the number of scallops relative to the number rollers in contact with the scallops, determines the direction of rotation it would rotate the output (21) if the cage (22) was held still. One more scallop than the number of rollers gives an output rotation direction the same as the cam rotation. One less scallop than the number of rollers would give an output rotation the opposite to the cam rotation. The scallops are so shaped that as the rollers are acted on by the cam, the scallops rotate relative to the cage at a constant angular velocity ratio to that of the cam. The action between the cam (17), bearing (18) and rollers (20) against the output (21), causes an equal and opposite reaction on the cage (22), tending to rotate it in the opposite direction to the rotation of the output (21).

The cage (22) is constrained by a rotation blocking means in such a way as to allow the cage (22) to only rotate in a direction the same as the output (21). Therefore because of the reactive forces, the cage (22) will be held against the rotation blocking means and will therefore be stationary relative to the frame (the structure holding mounting the motor etc.) with just the actions of assembly 11 alone. The rollers will rotate about there own axis as they move in relation to the scallops. A bearing could be fitted to the outside diameter of the cams (16 & 17) to eliminate the sliding action of roller (19 & 20) against cam (16 & 17), which would occur (if they were in direct contact) because of the difference in their circumferential speeds. The output (21) is constrained to rotate about the central axis of the input shaft (13). The cyclical movement of the rollers (20) acting on the scallops alone, causes the output (21) to rotate at a reduced rotational speed depending on the number of rollers and scallops.

For example, if the cage (22) is constrained from being able to rotate, and if assembly 11 has four rollers (20), and there are five scallops in the output (21), the ratio would be one output (21) revolution for every five revolutions of the cam (17) with the output (21) rotating in the same direction as the cam (17).

The second unequal coaxial assembly comprises of a cam (16), and rollers (19) and inner body (45) The scallops in the body (45) make contact with the rollers (19) which make contact with the cam (16). The number of scallops and rollers for the assembly are different to the first assembly 11. The rollers are located in equally spaced guides in the, cage (22). The cage therefore bridges axially between assemblies 11 and 12 and the rollers (19) are constrained to rotate at the same angular velocity about the central axis of the input shaft (13) as the rollers (20) of assembly 11. The numbers of scallops and rollers are such that if the cage (22) is held relative to the frame, the body (45) tends to cause the cam (16) to rotate with an angular velocity in the opposite direction to cam (17).

For example, if the cage (22) is constrained from being able to rotate, and if assembly 12 has four rollers (20), and there are three scallops in the body (45), the ratio would be one body (45) revolution for every three revolutions of the cam (16), with the body (45) rotating in the opposite direction to the cam (16).

If the assembly 11 cam (17) is caused to rotate, the body (45) will rotate at another angular velocity, being a fixed ratio to the input angular velocity. The assembly 12 cam (16) will rotate at an angular velocity dependent on the fixed ratio of assembly 12, and for the central concept of the present invention, in the opposite direction to cam (17). If assembly 12 was arranged so that cam (16) rotated in the same direction as cam (17), the output would be reversed if cam (16) was braked. The cam (16) will have no effect on the output angular velocity until a torque is made to act on it. Any torque acting on cam (16) could act in the same or opposite direction as, the rotation of the cam (16). If the torque acts in the same direction, the output would rotate at the angular velocity determined by the fixed ratio but with an increased torque. As in the previous embodiment the torque acting on cam (16) is in a direction opposite to that of the rotation of the cam (16) (ie. the same direction as the input shaft (13)). In this case, assembly 12 will act so as to try and cause the inner body (45), to rotate in the opposite direction and the cage (22) in the same direction as the input. In simplistic terms, the opposite actions on the output and cage caused by cam. (16) tend to 'lock' the cage (22) to the input rotation. The cage (22) is free to rotate in the direction of the input (cam (17)). The cage (22) therefore tends to cause the output (21) to rotate as one with the input. The rollers (20) rotation about the central axis of the input shaft (13) due to the action of the cam (17), has superimposed on it a rotation about this central axis due to the rotation of the cage (22) in the direction of the input. It is this superimposed rotation that causes the output to increase its angular velocity relative to the input angular velocity. The amount of rotation of the cage (22) and therefore the amount of superimposed rotation is determined by the relative differences in the output resistive torque (hereafter called the 'load') and the input torque from the cams (17 & 16). When the 'load' lowers relatively and the torque acting on cam (16) is increased, the less is the torque required from cam (17). As the proportion of torque from cam (16) relative to cam (17) increases, the more the output (21) tends to be 'locked' to the input and the more the ratio of input to output angular velocity tends to approach 1:1. The output gear ratio therefore can be progressively decreased from the fixed ratio of the first assembly to a 1:1 ratio by progressively increasing the torque acting on the cam (16) from zero to a value that causes the cage (22) to be 'locked' fully to the input. The output torque is inversely proportional to the output angular velocity.

The input torque to cam (16) can be through another motive source or a clutch mechanism connecting the input shaft (13) to the extension of cam (16). If a clutch mechanism was used, the control mechanism could be automatic and linked to the output speed through the use of a centrifugal clutch. With a centrifugal clutch arrangement, as the speed of the output increases the clutch engages and tends to turn cam (16) in the same direction as the input, cam (17). So as the output is accelerated at the lower fixed ratio, there will come a stage when the input shaft is spinning at such a speed that the centrifugal clutch starts to engage. As the centrifugal clutch engages, the output gear ratio would progressively decrease to 1:1.

With the addition of other rotation blocking means to this arrangement to constrain other parts to rotate in one direction only, there is the possibility of having sequentially selected multiple ratios with other outputs. For example if the rotation blocking means is connected to cam (16), (or other especially designed cages or ring gears with cams can provide unlimited features) of the transmission the output will be the body (21) or (51), There is also the option of arranging the cage (22) so that it protrudes from the right-hand side of FIG. 2. The cam (16) can have an extension and its rotation could be controlled by various external or internal means.

Whilst the above has been given by way of illustrative example of the present invention many variations and modifications thereto will be apparent to those skilled in the art without departing from the broad ambit and scope of the invention as herein set out in the appended claims.

The invention claimed is:

1. A epicyclic transmission having-at least one input and one output and involving interaction of three mechanically distinct rotating elements with any suitable form that allows the transfer of torque between input and output, namely a sun element, a ring element and a planet element in each of at least first and second unequal co-axial epicyclic assemblies, a first element of the first assembly and a first element of the second assembly able to rotate independently, the first rotating element of the second assembly able to be within the first rotating element of the first assembly, a second rotating element of the first assembly and a second rotating element of the second assembly being constrained to rotate at a common angular velocity, a third element of the first assembly being connected to a motive source, and control means for progressively changing the gear-ratio applied to a load connected to the first element of the first assembly of the transmission characterised in that the first and second assemblies each represent unequal fixed gear ratios respectively between the input and the output, the first and second assemblies arranged so that if individually each assembly has their first element constrained and their third element rotated in a certain direction the second element will try to rotate in an opposite direction relative to the tendency of the other assembly, the control means being operative to progressively increase or decrease the output gear ratio in accordance with the demand for an output lower or higher gear stage of operation.

2. A transmission according to claim 1 wherein the first elements are the ring elements of the respective assemblies, the ring elements being outer bodies having spaced endless scallop guides being adapted to receive sets of planet elements being in the form of rollers, the second rotating elements comprising of planet carrier elements and planet elements, the planet carrier elements of the respective assemblies constrained to rotate about an axis collinear with the axes of their respective third elements, the planet carrier elements locating and controlling the motion of integral spaced sets of rollers corresponding to the planet elements of each assembly, the rollers bridging between the scallop guides of the outer bodies and the third elements of the assemblies, the planet carrier elements being constrained by a rotation controlling means allowing free rotation in one direction and a controlled rotation in the other direction, the third elements of the assemblies being sun elements in the form of respective cams.

3. A transmission according to claim 1 wherein the first elements are the ring elements of the respective assemblies, the second rotating elements comprising of planet carrier elements and planet elements, the planet carrier elements of the respective assemblies constrained to rotate about an axis collinear with the axes of their respective third elements, the planet elements constrained to rotate on their own axes with the axes being constrained to rotate with the planet carrier element, the planet elements with their axes offset from their respective planet carrier element so as to bridge individually or in combination with other planet elements between the ring element and the third element of their respective assembly, the planet carrier elements being constrained by a rotation controlling means allowing free rotation in one direction and a controlled rotation in the other direction, the third elements of the assemblies being sun elements, the ring and planet and sun elements being in a form that will allow the transfer of torque at a fixed ratio between elements.

4. A transmission according to claim 2 wherein the first elements are the ring elements of the respective assemblies, the ring elements being outer bodies having spaced endless scallop guides being adapted to receive sets of planet elements being in the form of rollers, the second rotating elements comprising of planet carrier elements and planet elements, the planet carrier elements of the respective assemblies constrained to rotate about an axis collinear with the axes of their respective third elements, the planet carrier elements locating and controlling the motion of integral spaced sets of rollers corresponding to the planet elements of each assembly, the rollers bridging between the scallop guides of the outer bodies and the third elements of the assemblies, the planet carrier elements being constrained by a rotation controlling means allowing free rotation in one direction and a controlled rotation in the other direction, the third elements of the assemblies being sun elements in the form of respective cams, the control means being operable to supply a variable rotation to the third element of the second assembly across a continuous range of output gear ratios between low and high angular velocities at respective predetermined low and high output angular velocities.

5. The transmission according to claim 3 wherein the first elements are the ring elements of the respective assemblies, the second rotating elements comprising of planet carrier elements and planet elements, the planet carrier elements of the respective assemblies constrained to rotate about an axis collinear with the axes of their respective third elements, the planet elements constrained to rotate on their own axes with the axes being constrained to rotate with the planet carrier element, the planet elements with their axes offset from their respective planet carrier element so as to bridge individually or in combination with other planet elements between the ring element and the third element of their respective assembly, the planet carrier elements being constrained by a rotation controlling means allowing free rotation in one direction and a controlled rotation in the other direction, the third elements of the assemblies being sun elements, the ring and planet and sun elements being in a form that will allow the transfer of torque at a fixed ratio between elements, the control means being operable to supply a variable rotation to the third element of the second assembly across a continuous range of output gear ratios between low and high angular velocities at respective predetermined low and high output angular velocities.

6. A transmission according to claim 2 wherein the first elements are the ring elements of the respective assemblies, the ring elements being outer bodies having spaced endless scallop guides being adapted to receive sets of planet elements being in the form of rollers, the second rotating elements comprising of planet carrier elements and planet elements, the planet carrier elements of the respective assemblies constrained to rotate about an axis collinear with the axes of their respective third elements, the planet carrier elements locating and controlling the motion of integral spaced sets of rollers corresponding, to the planet elements of each assembly, the rollers bridging between the scallop guides of the outer bodies and the third elements of the assemblies, the planet carrier elements being constrained by a rotation controlling means allowing free rotation in one direction and a controlled rotation in the other direction, the third elements of the assemblies being sun elements in the form of respective cams, the first element of the second assembly constrained to a fixed frame of reference, a third element of the second assembly rotating at a controlled angular velocity the control means being operative to progressively increase or decrease the output gear ratio in accordance with the demand for an output lower or higher gear stage of operation.

7. A transmission according to claim 3 wherein the first elements are the ring elements of the respective assemblies, the second rotating elements comprising of planet carrier elements and planet elements, the planet carrier elements of the respective assemblies constrained to rotate about an axis collinear with the axes of their respective third elements, the planet elements constrained to rotate on their own axes with the axes being constrained to rotate with the planet carrier element, the planet elements with their axes offset from their respective planet carrier element so as to bridge individually or in combination with other planet elements between the ring element and the third element of their respective assembly, the planet carrier elements being constrained by a rotation controlling means allowing free rotation in one direction and a controlled rotation in the other direction, the third elements of the assemblies being sun elements, the ring and planet and sun elements being in a form that will allow the transfer of torque at a fixed ratio between elements, the first element of the second assembly constrained to a fixed frame of reference, a third element of the second assembly rotating at a controlled angular velocity the control means being operative to progressively increase or decrease the output gear ratio in accordance with the demand for an output lower or higher gear stage of operation.

8. A transmission according to claim 2 wherein the first elements are the ring elements of the respective assemblies, the ring elements being outer bodies having spaced endless scallop guides being adapted to receive sets of planet elements being in the form of rollers, the second rotating elements comprising of planet carrier elements and planet elements, the planet carrier elements of the respective assemblies constrained to rotate about an axis collinear with the axes of their respective third elements, the planet carrier elements locating and controlling the motion of integral spaced sets of rollers corresponding to the planet elements of each assembly, the rollers bridging between the scallop guides of the outer bodies and the third elements of the assemblies, the planet carrier elements being constrained by a rotation controlling means allowing free rotation in one direction and a controlled rotation in the other direction, the third elements of the assemblies being sun elements in the form of respective cams, the first element of the second assembly constrained from rotating in one direction by a fixed frame of reference and free to rotate in the other direction.

9. A transmission according to claim 3 wherein the first elements are the ring elements of the respective assemblies, the second rotating elements comprising of planet carrier elements and planet elements, the planet carrier elements of the respective assemblies constrained to rotate about an axis collinear with the axes of their respective third elements, the planet elements constrained to rotate on their own axes with the axes being constrained to rotate with the planet carrier element, the planet elements with their axes offset from their respective planet carrier element so as to bridge individually or in combination with other planet elements between the ring element and the third element of their respective assembly, the planet carrier elements being constrained by a rotation controlling means allowing free rotation in one direction and a controlled rotation in the other direction, the third elements of the assemblies being sun elements, the ring and planet and sun elements being in a form that will allow the transfer of torque at a fixed ratio between elements, the first element of the second assembly constrained from rotating in one direction by a fixed frame of reference and free to rotate in the other direction.

10. A transmission according to claim 2 wherein the first elements are the ring elements of the respective assemblies, the ring elements being outer bodies having spaced endless scallop guides being adapted to receive sets of planet elements being in the form of rollers, the second rotating elements comprising of planet carrier elements and planet elements, the planet carrier elements of the respective assemblies constrained to rotate about an axis collinear with the axes of their respective third elements, the planet carrier elements locating and controlling the motion of integral spaced sets of rollers corresponding to the planet elements of each assembly, the rollers bridging between the scallop guides of the outer bodies and the third elements of the assemblies, the planet carrier elements being constrained by a rotation controlling means allowing free rotation in one direction and a controlled rotation in the other direction, the third elements of the assemblies being sun elements in the form of respective cams, the third element of the second assembly being constrained to rotate at a respective fixed gear ratio relative to an input to the transmission, the control means being operable to supply a variable rotation to the first element of the second assembly across a continuous range of output gear ratios between low and high angular velocities at respective predetermined low and high output angular velocities.

11. A transmission according to claim 3 wherein the first elements are the ring elements of the respective assemblies, the second rotating elements comprising of planet carrier elements and planet elements, the planet carrier elements of the respective assemblies constrained to rotate about an axis collinear with the axes of their respective third elements, the planet elements constrained to rotate on their own axes with the axes being constrained to rotate with the planet carrier element, the planet elements with their axes offset from their respective planet carrier elements so as to bridge individually or in combination with other planet elements between the ring element and the third element of their respective assembly, the planet carrier elements being constrained by a rotation controlling means allowing free rotation in one direction and a controlled rotation in the other direction, the third elements of the assemblies being sun elements, the ring and planet and sun elements being in a form that will allow the transfer of torque at a fixed ratio between elements, the third element of the second assembly being constrained to rotate at a respective fixed gear ratio relative to an input to the transmission, the control means being operable to supply a variable rotation to the first element of the second assembly across a continuous range of output gear ratios between low and high angular velocities at respective predetermined low and high output angular velocities.

12. A transmission according to claim 2 wherein the first elements are the ring elements of the respective assemblies, the ring elements being outer bodies having spaced endless scallop guides being adapted to receive sets of planet elements being in the form of rollers, the second rotating elements comprising of planet carrier elements and planet elements, the planet carrier elements of the respective assemblies constrained to rotate about an axis collinear with the axes of their respective third elements, the planet carrier elements locating and controlling the motion of integral spaced sets of rollers corresponding to the planet elements of each assembly, the rollers bridging between the scallop guides of the outer bodies and the third elements of the assemblies, the planet carrier elements being constrained by a rotation controlling means allowing free rotation in one direction and a controlled rotation in the other direction, the third elements of the assemblies being sun elements in the form of respective cams, the third element of the second assembly being constrained to rotate at a respective fixed gear ratio relative to an input to the transmission, the flow of a suitably formulated fluid or gas due to the action of the first element of the second assembly against a fixed frame of reference being directed and controlled in two circuits, the flow of said suitably formulated fluid or gas from the said first element of the second assembly in the first circuit being directed and controlled towards the contracting spaces on one side of the rollers of the first assembly so as to tend to restrict the movement of the rollers within the scallops of the first element of the first assembly, the flow of said suitably formulated fluid or gas in the second circuit being directed and controlled towards a part of the a transmission that provides a low resistance to flow, the progressive control of the amount of flow of the said suitably formulated fluid or gas in the first and second circuits operable to progressively change the gear ratio applied to a load connected to the first element of the first assembly of the Variable Ratio Multi-gear.

13. A transmission according to claim 10 wherein energy can be transferred to the suitably formulated fluid or gas and stored internally or externally so as to enable the return of the energy to the load when required.

14. A transmission according to claim 2 wherein the first elements are the ring elements of the respective assemblies, the ring elements being outer bodies having spaced endless scallop guides being adapted to receive sets of planet elements being in the form of rollers, the second rotating elements comprising of planet carrier elements and planet elements, the planet carrier elements of the respective assemblies constrained to rotate about an axis collinear with the axes of their respective third elements, the planet carrier elements locating and controlling the motion of integral spaced sets of rollers corresponding to the planet elements of each assembly, the rollers bridging between the scallop guides of the outer bodies and the third elements of the assemblies, the planet carrier elements being constrained by a rotation controlling means allowing free rotation in one direction and a controlled rotation in the other direction, the third elements of the assemblies being sun elements in the form of respective cams, the rotation of the third elements causing motion of the second rotating elements, the motion of the second and third elements causing contracting and expanding spaces, the contracting spaces in the first assembly displacing a suitably formulated fluid or gas, the displaced fluid or gas being directed into and controlled in two circuits, the control means proportioning the flow of said suitably formulated fluid or gas in the said two circuits in accordance with the demand for an output lower or higher gear stage of operation, the flow of said suitably formulated fluid or gas in the first circuit being used to rotate the third element of the second assembly, the flow of said suitably formulated fluid or gas in the second circuit being directed and controlled towards a part of the transmission that provides a low resistance to flow, the suitably formulated fluid or gas being drawn into the expanding spaces of the first assembly in a controlled manner after completing the first or second circuits, the progressive control of the amount of flow of the said suitably formulated fluid or gas in the first and second circuits operable to progressively change the gear ratio applied to a load connected to the first element of the first assembly of the Variable Ratio Multi-gear.

15. A transmission according to claim 12 wherein energy can be transferred to the suitably formulated fluid or gas and stored internally or externally so as to enable the return of the energy to the load when required.

16. A transmission according to claim 1 wherein the axis of the input or inputs are collinear with the axis of the third element of the first assembly, the axis of the output or outputs are collinear with the axis of the third element of the first assembly, the axis of the third elements of the first and second assemblies are collinear, the elements of both assemblies supported directly or indirectly by the fixed frame of reference, the motive source supported directly or indirectly by the fixed frame of reference, the reactive torque from the motive source acting on the fixed frame of reference.

17. A transmission according to claim 1 wherein the axis of the inputs are collinear with the axis of the third element of the first assembly, the axis of the output or outputs are collinear with the axis of the third element of the first assembly, the axis of the third elements of the first and second assemblies are collinear, the elements of both assemblies supported directly or indirectly by the fixed frame of reference, a motive source supported directly or indirectly by the fixed frame of reference and connected to the third element of the first assembly, another motive source supported directly or indirectly by the fixed frame of reference and connected to the third element of the second assembly, the reactive torques from the motive sources acting on the fixed frame of reference.

18. A transmission according to claim 1 wherein the axis of the inputs are collinear with the axis of the third element of the first assembly, the axis of the output or outputs are collinear with the axis of the third element of the first assembly, the axis of the third elements of the first and second assemblies are collinear, the elements of both assemblies supported directly or indirectly by the fixed frame of reference, an input driven by external influences including wind connected to the third element of the first assembly, another input source driven by external influences and connected to the third element of the second assembly.

19. A epicyclic transmission having an input and two contra-rotating outputs involving interaction of three mechanically distinct rotating elements with any suitable form that allows the transfer of torque between input and output, namely a sun element, a ring element and a planet element being in each of at least first, second and third co-axial epicyclic assemblies, a second rotating element of the first assembly and a second rotating element of the second assembly being constrained to rotate at a common angular velocity, the first element of the first assembly and the first element of the third assembly being constrained to rotate at a common angular velocity, and control means for progressively changing the gear ratio applied to a load connected to the first element of the first and third assemblies and another load connected to the second element of the third assembly of the Variable Ratio Multi-gear characterised in that the first and second assemblies each represent unequal fixed gear ratios respectively between the input and the output of the Variable Ratio Multi-gear the first and second assemblies arranged so that if individually each assembly has their first element constrained and their third element rotated in a certain direction the second element will tend to rotate in an opposite direction relative to the tendency of the other assembly, the third assembly arranged so that if individually it's first element is constrained and the third element rotated in the same certain direction of the first and second assemblies the second element will tend to rotate in the same direction as the second assembly, the control means being operative to progressively increase or decrease the output gear ratios in accordance with the demand for an output lower or higher gear stage of operation.

20. A transmission according to claim 1 wherein more elements can be included to provide overdrive speed and directional reversing features to a load coupled to the first element of the first assembly.

21. A transmission according to claim 1 wherein the rotation blocking and controlling means required can provide energy storage able to be re used, with mechanical or pressure accumulation.

22. A transmission according to claim 1 wherein the rotation blocking and controlling means can provide motor braking by automatically reversible one way clutches working in sequence for internally accessing carrier or ring-gear restricting.

23. A transmission according to claim 1 where the control of the load and with internal or external remote control between the first and the second and third elements of the second assembly can be activated by electro-magnetic, magnetic fields, or electro high voltage to activating suitable contents including Liquid Polymers in Silicon oil.

24. A transmission according to claim 1 where reactive feedback from the load is used to automatically stabilise mobile transport.

25. A transmission according to claim 1 where sophisticated electronic sensors including gravitational and tilt Sensors used to incorporate self stabilising to over ride mechanically fed back reaction from tilting of vehicles are placed in strategic positions.

26. A transmission according to claim 1 where a number of cages able to rotate about the first axis and each cage wholly or partially enclosed by the body, means between the central shaft and any number of the cages, means between the body and any number of the cages, means between the cages in any sets of combinations of any of the cages, wherein each input and each output is applied to or taken from one of the body, the central shaft and any number of the cages, and application of a first torque to the central shaft causing the central shaft to rotate about the axis while torques are applied, about the first axis, to any number of the cages will cause at least one of the cages, cams (sun-gears) and the body to rotate and, furthermore, variation of one of the torques between zero and a maximum value will cause a variation of the ratio of the angular velocities of the central shaft and the body through the actions of the means.

* * * * *